United States Patent [19]
Kaji et al.

[11] Patent Number: 5,196,208
[45] Date of Patent: Mar. 23, 1993

[54] APPARATUS FOR REMOVING CYLINDRICAL MOLDINGS FROM MOLDS

[75] Inventors: Shin-ichi Kaji; Kouji Watanabe, both of Kobe, Japan

[73] Assignee: Bando Kagaku Kabushiki Kaisha, Kobe, Japan

[21] Appl. No.: 730,557

[22] Filed: Jul. 16, 1991

[30] Foreign Application Priority Data

Jul. 23, 1990 [JP] Japan .................................. 2-194159

[51] Int. Cl.$^5$ ...................... B29C 39/36; B29C 43/02; B29C 43/50
[52] U.S. Cl. ........................................ 425/90; 425/99; 425/100; 425/407; 425/437; 425/547
[58] Field of Search ................... 425/436 R, 437, 438, 425/453, 457, 468, 422, 90, 99, 100, 407, 547

[56] References Cited

U.S. PATENT DOCUMENTS

| | | | |
|---|---|---|---|
| 2,361,026 | 10/1944 | Greene | 425/437 |
| 2,647,295 | 8/1953 | Gould | 425/436 |
| 2,860,374 | 11/1958 | Harrison et al. | 425/437 |
| 3,214,506 | 10/1965 | Corbin | 425/436 RM |
| 3,273,216 | 9/1966 | Gourlie | 425/438 |
| 4,233,006 | 11/1980 | Panas | 425/437 |
| 4,531,902 | 7/1985 | Stuhldreher et al. | 425/437 |
| 4,836,762 | 6/1989 | Davis | 425/437 |
| 5,129,810 | 7/1992 | Nakagi | 425/437 |

*Primary Examiner*—Willard Hoag
*Attorney, Agent, or Firm*—Marshall, O'Toole, Gerstein, Murray & Bicknell

[57] ABSTRACT

A mold removing apparatus for removing a mold from a cylindrical molding sticking to the external circumferential surface of a mold, the mold being hollow, having center bores at the center of both the top and the bottom thereof, and having a plurality of small through holes in the circumferential wall thereof. The apparatus further includes a mold lifting apparatus which has, in the forefront, positioning pieces which are insertable into the respective center bores of the mold, and holds the mold between the top and the bottom to raise the mold to the specified elevations, a pressurized fluid inlet port which is provided in the positioning piece to introduce a pressurized fluid into the cavity of the mold, a mold removing stage wherein a plurality of teeth are arranged to move towards or away from the outer circumferential surface of the mold, the teeth being capable of contacting or closing to the outer circumferential surface of the mold to engage the lower end face of the molding, a lifting mechanism for lifting or lowering the mold removing stage in the axial direction of the mold, and a mold transferring machine for delivering the mold to and discharging the mold from the mold lifting apparatus.

4 Claims, 12 Drawing Sheets

APPARATUS FOR REMOVING CYLINDRICAL MOLDINGS FROM MOLDS

FIELD AND BACKGROUND OF THE INVENTION

The present invention relates to an apparatus for removing a cylindrical mold, such as a cylindrical rubber molding, sticking to the outer circumferential surface of a mold, and in particular, to a mold removing apparatus wherein all of the steps of removing a molding from a mold are automated, including the delivery of a mold with a molding sticking to it into the mold removing apparatus and the discharge of the mold after removal of the molding from the mold.

Figures 5, 8, 9:
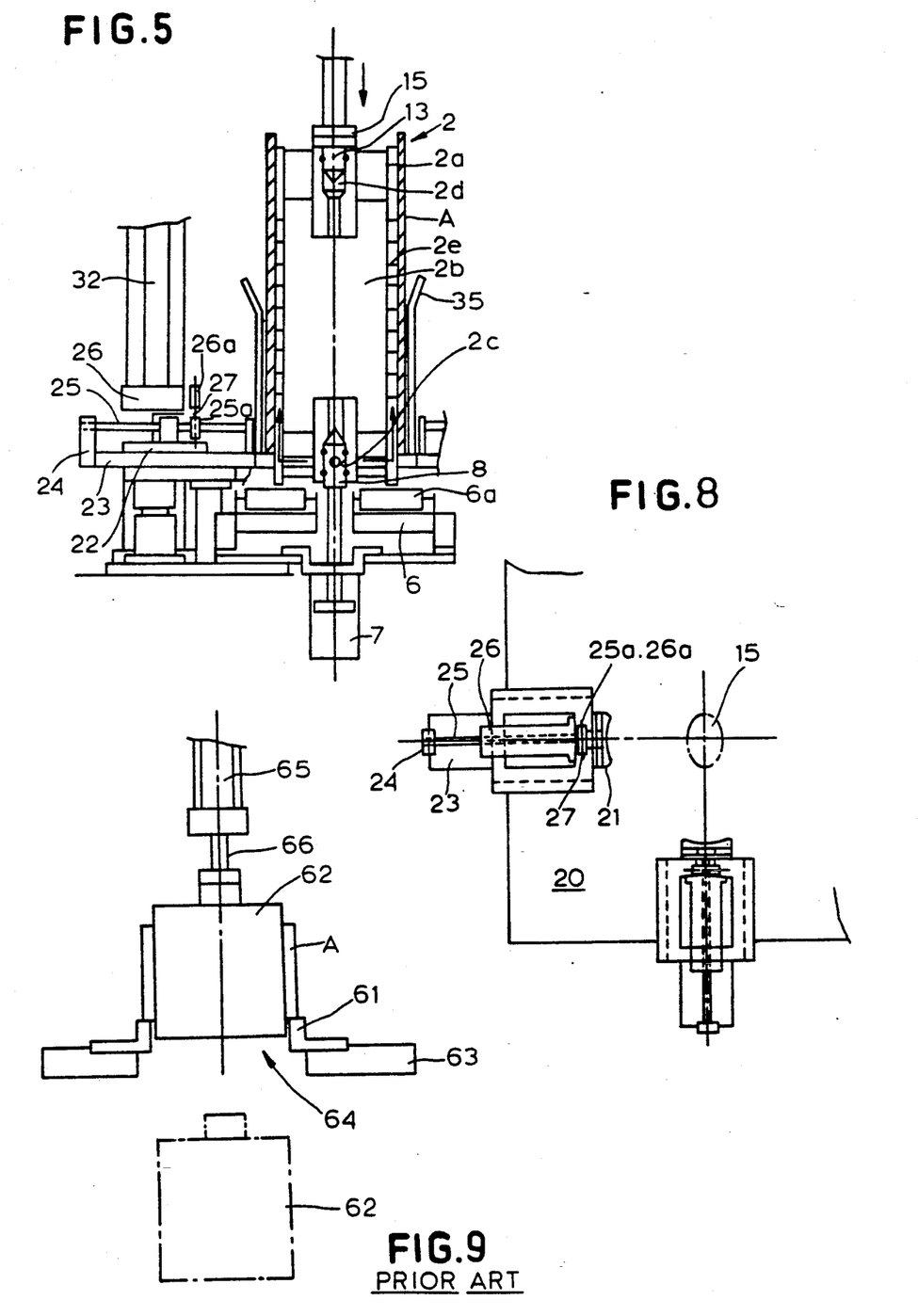
FIG. 8 is a fragmentary sectional view along the line VIII—VIII of FIG. 1.
FIG. 9 is a view of a mold removing apparatus of the prior art.

As an example, in the process of producing raw edge V-belts, a cylindrical unvulcanized belt material (consisting of rubber, cord, canvas, etc.) wound over a mold is first vulcanized in, for example, a vulcanizer. The mold onto which the vulcanized cylindrical rubber molding (called a slab) is sticking is then removed by a mold removing apparatus to recover the rubber molding product. The conventional mold removing apparatus had the following construction which is illustrated in FIG. 9: a mold removing ring element 61 having a bore slightly larger than to the outer diameter of a mold 62, is placed above the central opening 64 of a frame base 63. The lower end face of a cylindrical rubber molding A sticking to the outer circumferential surface of the mold 62 is placed on the ring element 61 so as to place the cylindrical rubber molding A together with the mold 62 on the ring element 61. A hydraulic cylinder unit 65 is installed above the center of the ring element 61, with the piston rod 66 of the unit 65 being directed downwardly. The piston rod 66 is extended to press down the mold 62 relative to the cylindrical rubber molding A which is held by the ring element 61 to remove the mold 62.

In contrast with the foregoing arrangement, there was another arrangement, not illustrated, wherein a mold is placed in a specified position on the frame base, and a ring element engaging to the top end surface of the cylindrical rubber molding is pressed downwardly by a piston rod of a hydraulic cylinder unit to remove the mold. In either case, the conventional mold removing apparatus used a fixed-shaped ring element 61 matched to the size of the mold 62 to remove the mold 62.

In the case of the above-mentioned conventional mold removing apparatus, however, whenever a mold is changed to a different size, it was necessary to change the ring element to match it with the size of the mold. The change was normally effected by a worker who selected one ring element from a large number of ring elements. Hence the burden on the workers was heavy, and the work efficiency was low since it took much time to change the ring element. Furthermore, since the mold is removed, with the internal circumferential surface of the cylindrical rubber molding closely adhering to the external circumferential surface of the mold, it was necessary to use a very large pressing force (mold removing force) which is exerted by the piston rod of the cylinder unit onto the mold or onto the ring element. Accordingly, the ring element tended to be damaged, and when the mounting of the mold was not appropriate, the mold could be damaged. Due to causes similar to those mentioned above, during removal of the mold, the cylindrical rubber molding tended to become wrinkled or damaged and become useless as a product; consequently, the yield was not satisfactory.

Furthermore, in the case of the conventional mold removing apparatus, the delivery of a mold onto the ring element and the discharge (recovery) of the mold after removal of the molding had to be made by lifting the mold with a crane or the like. It, therefore, was necessary to provide the mold with fittings for hooking hooks, etc. Moreover, the molding from which the mold was removed would remain on the ring element. Handling of the molding and discharge of said mold required manual intervention; thus it was difficult to automatize the operation.

SUMMARY OF THE INVENTION

The present invention avoids the foregoing problems and is intended to provide a mold removing apparatus which is capable of removing molds of various sizes by automatically adjusting for the respective sizes, allows for automatization of the whole process of mold removing operation including the discharge of the mold to achieve a high efficiency of production, and uses a smaller mold removing force relative to the conventional apparatus to eliminate damages to the mold or the cylindrical molding.

To achieve the aforementioned objectives, the mold removing apparatus according to the present invention comprises a) a mold removing apparatus for removing a mold from a cylindrical molding sticking to the external circumferential surface of said mold, said mold being hollow, providing center bores at the center of both the top and the bottom thereof, and having a plurality of small through holes in the circumferential wall thereof, b) a mold lifting apparatus which has, in the forefront, positioning pieces which are insertable into the respective center bores of said mold, and holds the mold between the top and the bottom to raise the mold to the specified elevations, c) a pressurized fluid inlet port which is provided in said positioning piece to introduce a pressurized fluid into the cavity of the mold, d) a mold removing stage wherein a plurality of teeth are arranged to move towards or away from the outer circumferential surface of the mold, said teeth being capable of contacting or closing to the outer circumferential surface of the mold to engage the lower end face of said molding, e) a lifting mechanism for lifting or lowering said mold removing stage in the axial direction of the mold, and f) a mold transferring machine for delivering the mold to and discharging the mold from said mold lifting apparatus.

In the operation of the mold removing apparatus of the present invention having the aforementioned configuration, (1) a mold with a cylindrical molding sticking onto the outer circumferential surface thereof is delivered by the conveyor system into the position of the mold lifting apparatus. (2) The opposing positioning pieces of the mold lifting apparatus move towards each other to be inserted into the center bores in both the top and the bottom of the mold. When the mold is held between said two pieces, the mold lifting apparatus will lift the mold to and hold at a specified elevation. (3) Then said mold removing stage will be lowered by the lifting mechanism thereof to the level of the bottom end of the mold. (4) At the same time, the plurality of the teeth will move forward together to contact or close to the outer circumferential surface of the mold and engage with the lower end of the cylindrical molding sticking to the outer circumferential surface of the mold. The respective teeth are capable of, regardless of the size of the mold, contacting or closing to the outer circumferential surface of the mold according to the size of the mold and engaging the lower end of the molding. (5) Under this condition, the pressurized fluid will flow into the cavity of the mold through the pressurized fluid inlet port of the positioning piece inserted in the center bore of the mold. The pressure inside the cavity will rise gradually, and when the pressure overcomes the sticking force of the cylindrical molding sticking to the outer circumferential surface of the mold, the pressurized fluid will blow simultaneously out of the plurality of small holes in the circumferential wall. A fluid layer will be formed between the outer circumferential surface of the mold and the inner circumferential surface of the cylindrical molding, with the inner circumferential surface of the cylindrical molding being separated from the outer circumferential surface of the mold. This will reduce, to one half, the mold removing force required to remove the inner mold from the cylindrical molding. (6) Then the respective teeth will be raised together with the mold removing stage by the lifting mechanism from the level of the lower end of the mold while the mold is being held at the specified elevation by the mold lifting apparatus; thus the cylindrical mold will be removed from the mold. As the respective (mold removing) forces acting on the mold and on the cylindrical molding during mold removal are reduced relative to those exerted by the conventional apparatus, such reduced forces will not damage the mold or the molding. After the molding is completely removed and held by the teeth above the mold, (7) the mold will be lowered by the mold lifting apparatus onto the mold transport apparatus. (8) Then the mold will be carried away by the transport apparatus.

In the aforementioned mold removing apparatus, it is desirable g) to provide the mold removing stage with a plurality of holders in such a way that the holders can be moved towards or away from the molding, the holders being designed to hold the cylindrical molding while removed from the outer circumferential surface of the mold by the teeth, and h) to provide a molding discharge apparatus which extends above the molding transfer apparatus to receive the molding.

Thus, in the present mold removing apparatus, after the mold is carried out by the transfer apparatus, (8)', the molding discharge apparatus will extend above the transfer apparatus. (9)' Then the plurality of holders will move simultaneously towards the molding removed by the teeth to hold the molding. The teeth are normally retracted when the molding is being held by the holders. (9)'' When the holders are retracted, the molding will descend onto the molding discharge apparatus, and (10)' the molding will be carried out by the discharge apparatus.

The present invention has the following advantages or effects:

(1) Since the molding is removed by a plurality of teeth engaging the end face of a cylindrical molding, the teeth being movable towards and away from the mold, the mold removing apparatus of the present invention is capable of removing molds of various sizes by automatically adjusting for the respective sizes. In contrast with the conventional apparatus, the apparatus of the present invention does not require replacement of the ring element whenever a mold of a different size is used. Thus less labor on the part of the operators is required and the production efficiency is higher. Further, a pressurized fluid is arranged to blow out between the outer circumferential surface of the mold and the internal circumferential surface of the cylindrical molding sticking to the mold so as to separate the cylindrical molding from the mold. Because mold removing is effected under this condition, the mold removing force is reduced significantly relative to the conventional apparatus, and mold removal can be made reliable. Furthermore, the cylindrical molding can be removed from the mold while the strains in the core of the cylindrical molding are kept balanced. This arrangement eliminates wrinkles or damages from the cylindrical molding, resulting in a high yield of the product.

(2) The range of the vertical movement of the mold is minimized by removing the cylindrical molding upwardly from the mold. This arrangement allows easier automatization of the delivery and discharge of the mold, and the space required for the entire apparatus can be reduced. As the transfer of the mold is effected by a conveyor system, in contrast with the conventional apparatus, there is no need to provide the mold with sling fittings for lifting the mold with a crane, etc. Since many molds are required, this feature is effective in reducing the cost.

(3) In addition to the effects described in (1) and (2) above, there is also the effect that the recovery of the cylindrical molding can be effected smoothly and reliably.

(4) The transfer operation of the mold is automated. Hence the burden on the workers is reduced significantly and much labor is saved. Moreover, the safety of the operation is improved. The transfer efficiency is raised and the productivity is improved.

DETAILED DESCRIPTION

Figure 1:
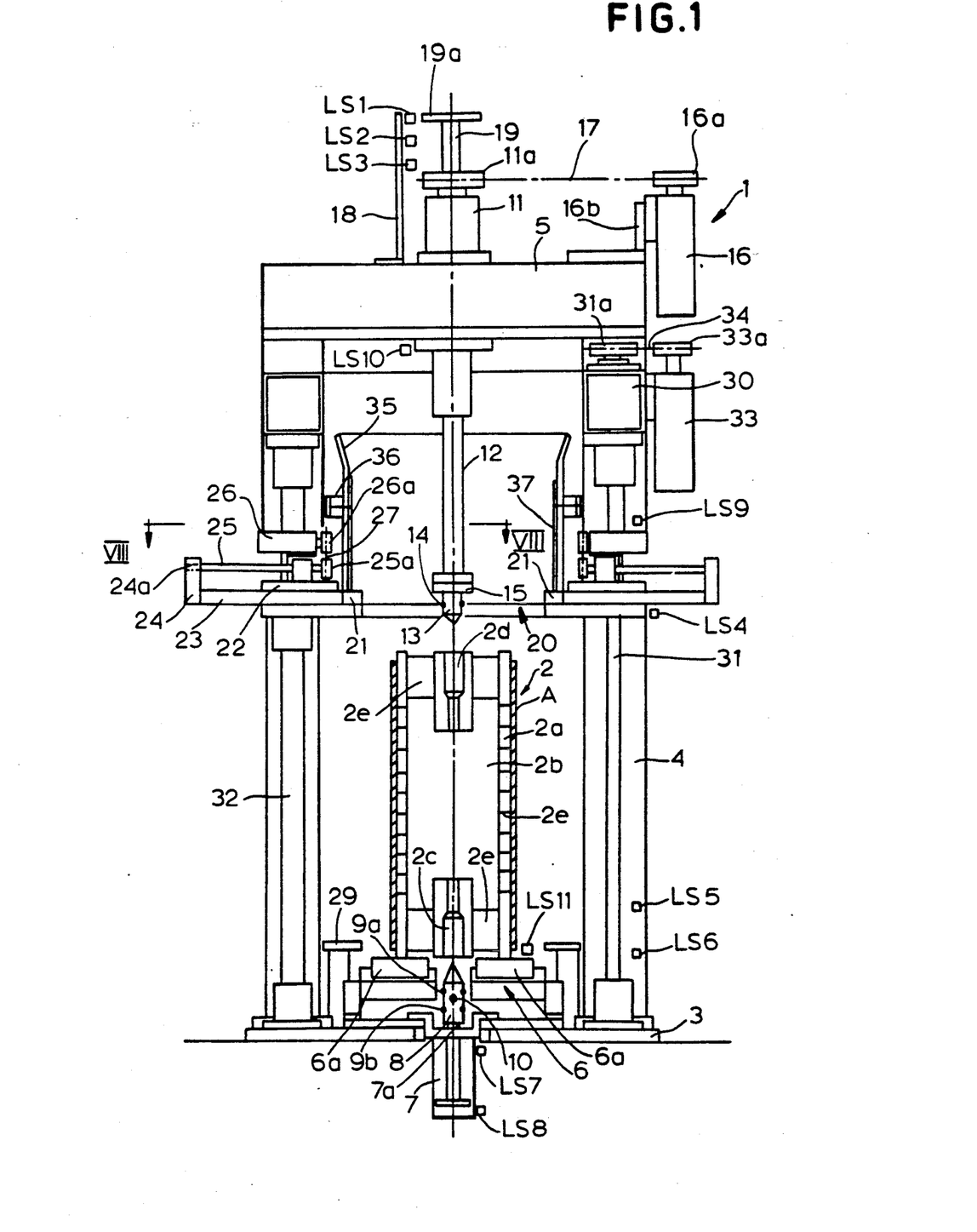
FIG. 1 is a view partly in section showing an embodiment of the mold removing apparatus according to the present invention.

With reference first to FIG. 1, a tubular or cylindrical rubber molding A (also called a slab) before being be sliced into the finished products is wound over the outer circumferential surface of a mold 2 and then vulcanized. After that, a mold removing apparatus 1 is used to remove the slab A from the mold 2, the slab A normally sticking to the mold 2.

The mold 2 has a hollow configuration, and its circumferential wall 2a is provided with a plurality (24 in the present embodiment) of small through holes 2e (for instance, around 1 mm in diameter) at regular intervals. Center bores 2c and 2d are provided at the center of both the top and the bottom end walls 2e of the mold 2. In the vulcanizing process (the step before the last) steam is introduced into the cavity 2b through these center bores 2c and 2d.

Pillars 4 are erected at the four corners of a base 3 of the mold removing apparatus 1, and a support plate 5 is placed across the top ends of the respective pillars 4.

A roller conveyor system 6 is provided over the base 3 to transfer the mold 2. This roller conveyor system 6 has a construction wherein a large number of conveyor rollers 6a are arranged in parallel with each other at regular intervals on the right and left sides (see FIG. 10).

Beneath the gap between said right and left rows of conveyor rollers 6a, an air cylinder system 7 (FIG. 1) is mounted with its piston rod 7a directed upwardly. On the top end of the piston rod 7a, a cone-shaped positioning piece 8 is mounted, the positioning piece 8 being insertable into the center bore 2c of the mold 2. On the circumferential surface of the piece 8 are installed O-rings 9a and 9b, the rings being spaced vertically. At a center between the O-rings 9a and 9b is provided an inlet port 10 for pressurized air. The inlet port 10 is provided with a conduit for pressurized air (not illustrated) through the piece 8, and one end of the conduit is connected to a pressurized air source (not shown).

In the center of the support plate 5 is provided a feed screw mechanism 11, and a mold removing shaft 12 is connected to the lower end of the feed screw mechanism 11, the mold removing shaft 12 being opposed and in line with the air cylinder system 7 and being movable vertically. On the bottom end of the shaft 12 is mounted a cone-shaped positioning piece 13, on the circumferential surface of the piece 13 is mounted an O-ring 14, and on the top end of the piece 13 is fixed a member 15. A motor 16 for driving the feed screw mechanism 11 (shaft 12) is provided on one side of the support plate 5 via a bracket 16b. On the top end of the motor 16 is fixed a pulley 16a, and on the top end of the feed screw mechanism 11 is fixed a pulley 11a. The pulleys 11a and 16a are connected with each other by a drive belt 17. On the support plate 5 is erected a support bracket 18 which extends in parallel with the feed screw mechanism 11. Limit switches LS1, LS2 and LS3 are mounted at intervals on the support bracket 18, the limit switch LS1 being placed near the top end of the bracket 18. A switch actuating piece 19 is mounted on the top end of the feed screw mechanism 11.

As shown in FIG. 1 and FIG. 8, a plurality (four in the present embodiment) of teeth 21 are arranged at intervals around the mold 2 so that the teeth 21 can move radially towards and away from the mold 2, the teeth 21 being designed to contact the outer circumferential surface of the mold 2 and engage the bottom end of the cylindrical slab A. The respective teeth 21 are mounted on the top end of the sliding members 23 which are arranged to move in the radial directions of the mold 2 between a mold removing stage 20 comprising a square frame and a guide plate 22 which is located above the mold removing stage 20. A support piece 24 is fixed to the root or outer end of each sliding member 23, and the sliding member 23 is arranged to be moved forward and backward by a drive motor 26 via a screw mechanism 25 which is screwed into a threaded hole 24a provided in the upper part of the support piece 24. The motor 26 is provided with a torque limiter, and when the tooth 21 contacts the circumferential surface of the mold 2, the motor 26 will idle. Numerals 25a and 26a indicate pulleys, and 27 is a drive belt. The teeth 21 are arcuate (FIG. 8) or in a form of a letter V so that the teeth contact the outer circumferential surface of the mold 2 irrespective of the size (external diameter) thereof. The number of the teeth 21 must be at least two. The material of the teeth 21 is not limited to any particular materials, but it is desirable to use a synthetic resin such as nylon resin so as to prevent any damage to the mold 2.

The mold removing stage 20 is supported by a guide rod 32 in such a way that the mold removing stage 20 can move freely in the vertical direction, and the mold removing stage 20 is arranged to be moved by the rotation of the screw rod 31. The screw rod 31 and the guide rod 32 are provided between the support frame 30 and the base 3, the support frame 30 being installed across the pillars 4 beneath the support plate 5. The top portion of the screw rod 31 penetrates the support frame 30 and is held rotatably, and a pulley 31a is fixed to the top end of the screw rod 31. A drive motor 33 for rotating the screw rod 31 is mounted on one side of a support frame 30, and the pulley 33a which is fixed onto the top end of the motor 33 and the pulley 31a are connected together with a drive belt 34. The screw rod 31 is screwed into a threaded through a hole (not illustrated) in the mold removing stage 20, and the guide rod 32 is loosely positioned through a guide hole (not illustrated) in the mold removing stage 20. On the base 3 is provided a stop stand 29 for the mold removing stage 20.

Figure 7:
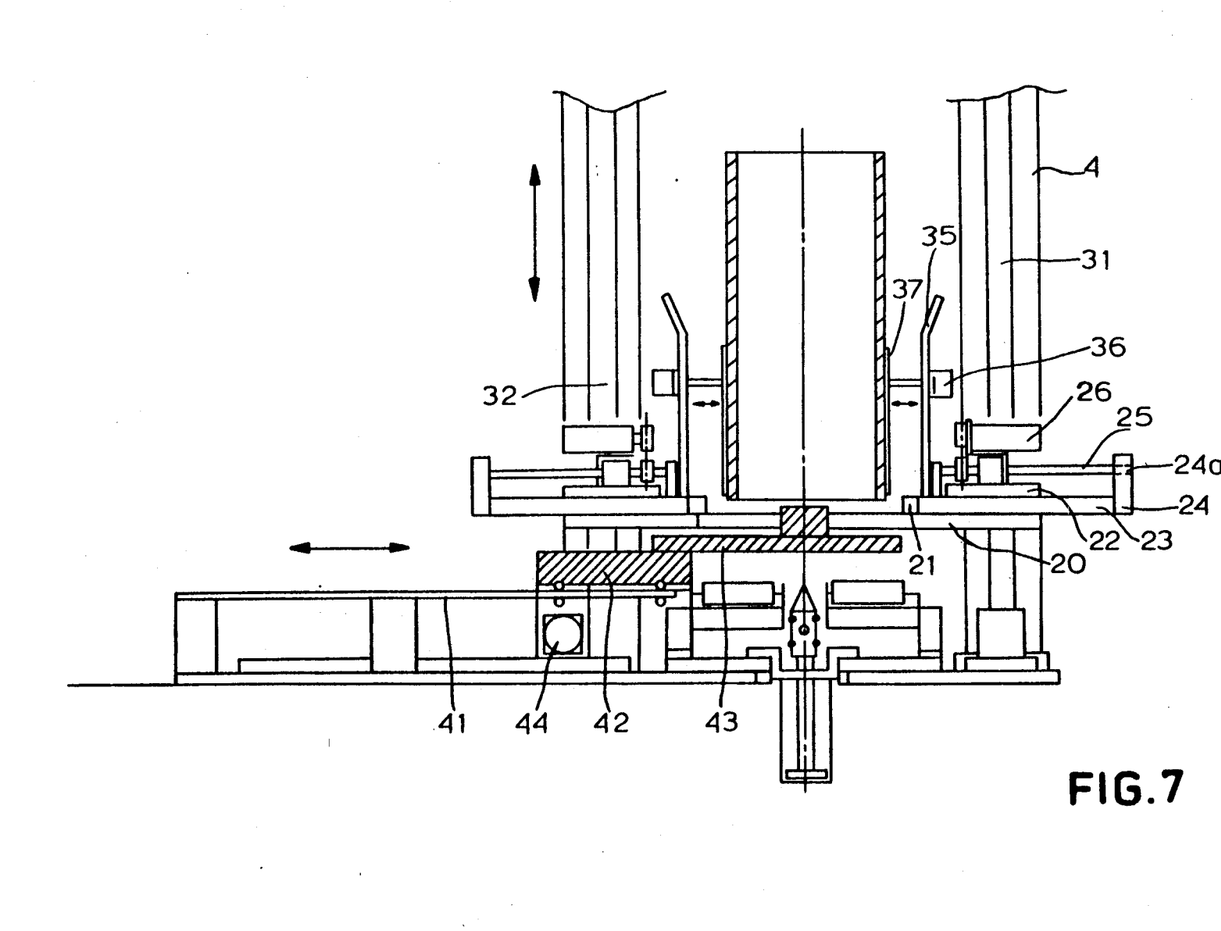

As shown in FIG. 7, on the teeth 21 are erected support members 35 with the top ends of the respective support members 35 being bent outwardly. A holder 37 for the slab A is provided inside each support member 35 via an air cylinder system 36 so that the holder 37 can move towards and away from the slab A.

Guide rails 41 are provided in a direction perpendicular to the roller conveyor system 6. A table 43 is provided at the top end of a cart 42 running on these guide rails 41, the table 43 being designed to extend above the roller conveyor system 6 to receive the slab A. Numeral 44 indicates a drive unit for the cart 42.

As shown in FIG. 1, in addition to the limit switches LS1 through LS3 for detecting the position of the shaft 12 described above, a limit switch LS4 for detecting the retreated position of the teeth 21 is provided on one end of the mold removing stage 20, and limit switches LS5, LS6 and LS9 (FIG. 1) for detecting the position of the mold removing stage 20 are provided along the screw rod 31. Moreover, limit switches LS7 and LS8 for detecting the position of the positioning piece 8 (piston rod 7a) are provided on the air cylinder system 7. A limit switch LS10 for detecting the mold removal completion of the slab A is placed beneath the support plate 5, and a limit switch LS11 for detecting the mold removal operation position of the mold 2 is provided above the roller conveyor system 6.

In the following, the operation of the mold removing apparatus 1, of the above-mentioned embodiment, is described.

(1) A slab A (a cylindrical rubber molding) taken out of a vulcanizer (not illustrated) and cooled, with the slab being stuck to the outer circumferential surface of the mold 2, is transferred to the mold removing apparatus 1 by the roller conveyor system 6. When the center bores 2c and 2d of the mold 2 align with the axial line connecting the opposing upper and lower positioning pieces 8 and 13, this state will be detected by the limit switch LS11 and a drive for the roller conveyor system 6 will be stopped (FIG. 1).

Figure 2:
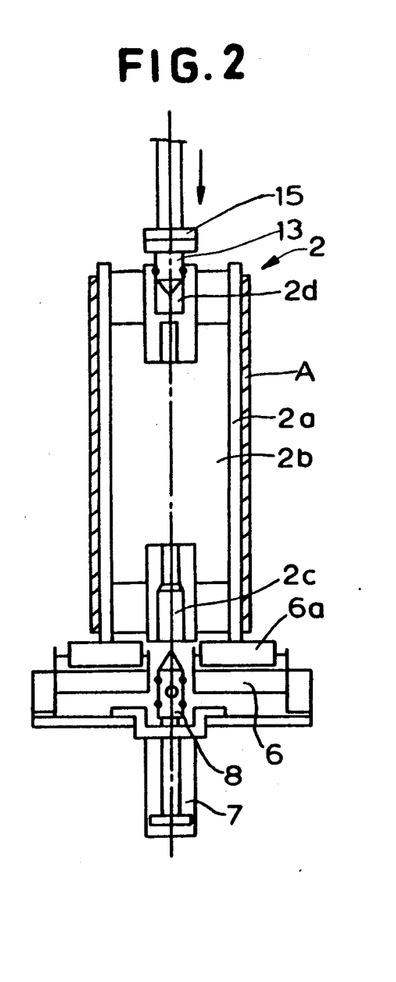
FIG. 2 through FIG. 7 are fragmentary sectional views showing, in sequence, the mold removing steps of the mold removing apparatus of FIG. 1.

(2) The motor 16 will turn, and via the feed screw mechanism 11, the shaft 12 will start to descend. When the limit switch LS3 is actuated by a part 19a which moves with the shaft 12, the motor 16 will halt and the descent of the shaft 12 will be terminated. Under this condition, a part of the positioning piece 13 on the bottom end of the shaft 12 will be inserted into the center bore 2d of the mold 2 (FIG. 2).

Figure 3:
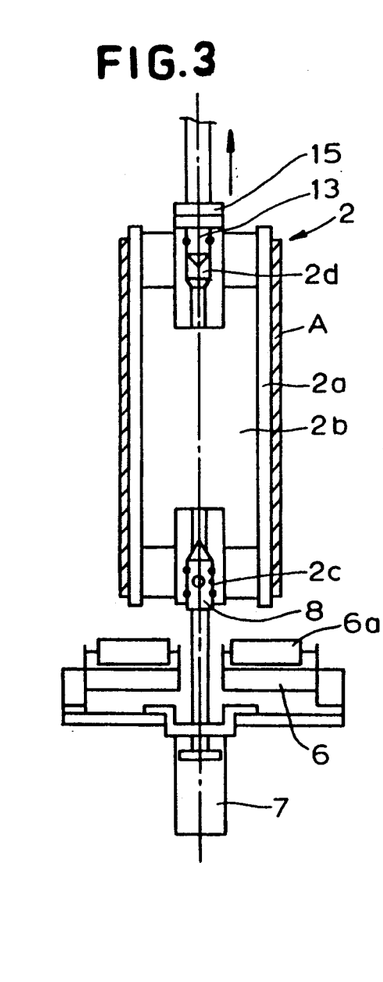

(3) The air cylinder system 7 at the bottom will move the piston rod 7a upwardly, and the positioning piece 8 on the top end of the piston rod 7a will extend through a pair of conveyor rollers 6a and be inserted into the center bore 2c of the mold 2. The piston rod 7a will rise until it is detected by the limit switch LS8 to raise the mold 2 to the specified position. When the mold 2 is raised, the positioning piece 13 will be completely inserted into the center bore 2d. After that, the motor 16 will turn (in reverse rotation) and the shaft 12 will rise until it is detected by the limit switch LS2 (FIG. 3).

Figure 4:
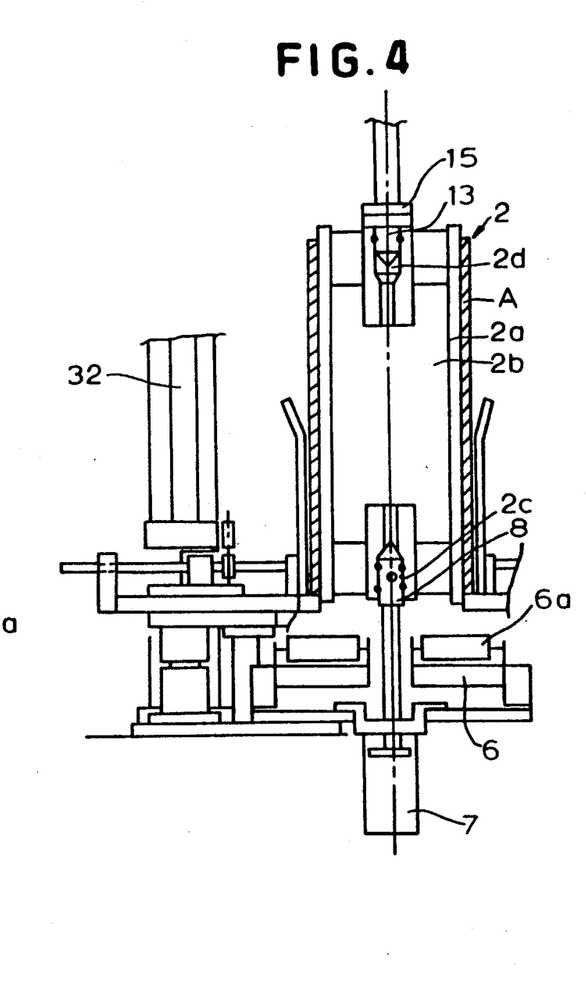

(4) The screw rod 31 will be rotated by the turning of the motor 33, and the mold removing stage 20 will start to descend. When the mold removing stage 20 is detected by the limit switch LS5, the turning speed of the motor 33 will slow down gradually, and when the mold removing stage 20 is detected by the limit switch LS6, the mold removing stage 20 will be halted. Under this condition, the mold removing stage 20 is at the bottom end of the mold 2. Next, the motor 26 will turn, and when the teeth 21 move forward and contact the outer circumferential surface of the mold 2, the rotation of the motor 26 (FIG. 4) will be halted by any desired means such as a relay.

(5) Pressurized air will be fed by a pressurized air source (not illustrated), and the pressurized air will be introduced through the inlet port 10 of the positioning piece 2c and into the cavity 2b of the mold 2. When the pressure inside the cavity 2b overcomes the adhesive force of the slab A sticking to the outer circumferential surface of the mold 2, the pressurized air will blow out of the small holes 2e in the circumferential wall 2a generating a shrill noise. In this condition, there is an air layer between the internal circumferential surface of the slab A and the outer circumferential surface of the mold 2, with the slab A being separated from the outer circumferential surface of the mold 2 (FIG. 5).

(6) The motor 16 will run intermittently, and the shaft 12 will gradually descend by short increments. The mold 2 will descend while the slab A is kept at a fixed position by the plurality of teeth 21 engaging the bottom end of the slab A. When the shaft 12 is inched downwardly, the air of the lower air cylinder unit 7 will be compressed and the unit 7 will descend. The mold 2 will descend until it is detected by the limit switch LS3, and the mold 2 will be partly removed from the slab A.

Figure 6:
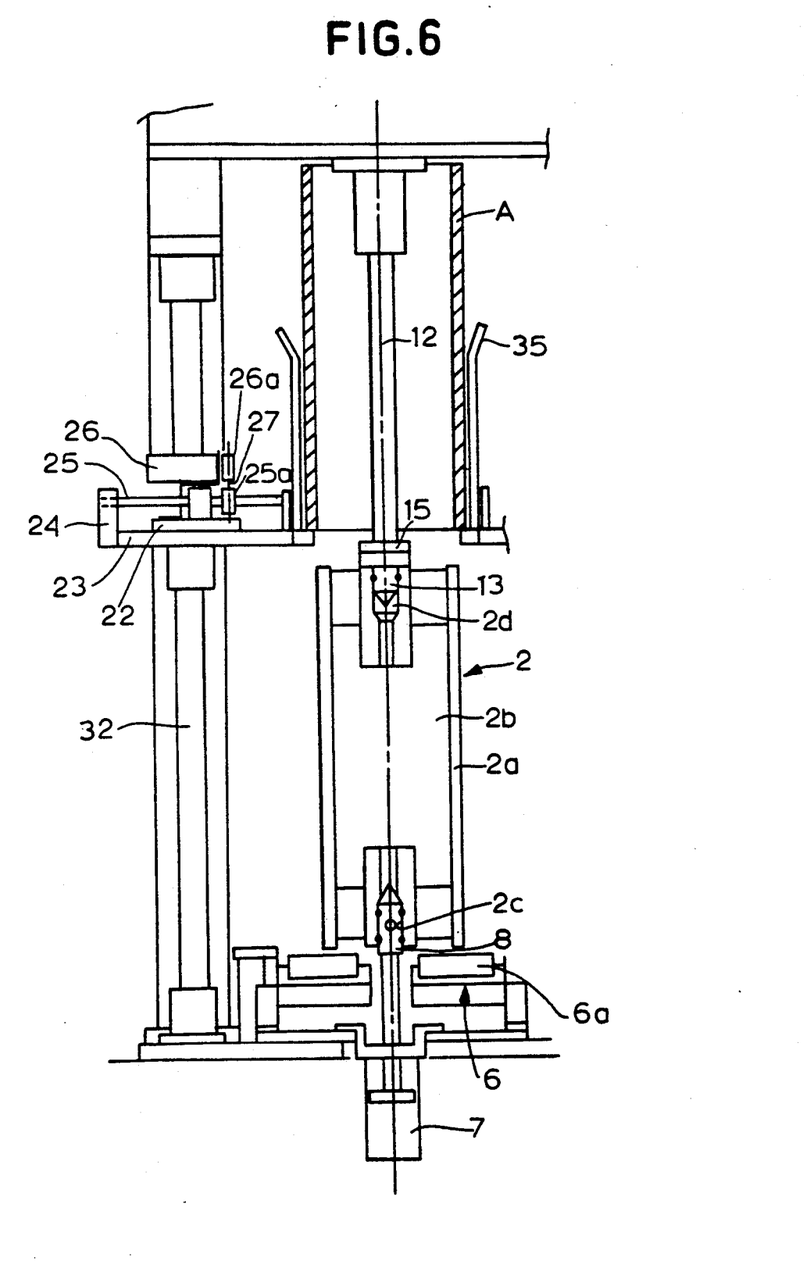

(7) The motor 33 will run (in the reverse rotation), and the turning of the screw rod 31 will raise the mold removing stage 20, which will remove slab A upwards away from the mold 2. When the limit switch LS10 detects the slab A (completion of the mold removal), the motor 33 will halt and the mold removing stage 20 will halt. At the same time, the introduction of the pressurized air through the inlet port 10 into the mold 2 will also be terminated (FIG. 6).

(8) After the completion of the mold removal, the motor 16 will turn and the shaft 12 will descend, and at the same time, the air cylinder unit 7 will allow the piston rod 7a to descend. As a result, the mold 2 will descend onto the roller conveyor system 6. The motor 16 will turn (reverse rotation), and the shaft 12 will ascend back to the initial position, and at the same time, the piston rod 7a will descend further back to the initial position. As a result, the positioning pieces 8 and 13 will move out of the center bores 2c and 2d of the mold 2. The mold 2 will be transferred to the next process by the roller conveyor system 6.

(9) The cart 42 will travel along the guide rails 41 towards the mold removing apparatus 1, and the table 43 will extend above the roller conveyor system 6. The motor 33 will turn, and with the rotation of the screw rod 31 the mold removing stage 20 will descend, and the stage 20 will be halted when it is detected by the limit switch LS5. The teeth 21 will be retracted by the running of the motor 26, and at the same time, the respective holders 37 will be advanced by the air cylinder units 36 to hold the slab A. When the return of the teeth 21 back to the initial positions is detected by limit switches LS4, the holders 37 will be retracted by the air cylinder units 36, and the slab A will descend along the holders 37 onto the table 43 (FIG. 7). The motor 33 will turn (reverse rotation) and the rotation of the screw rod 31 will raise the mold removing stage 20 back to the initial position. When the stage 20 is detected by the limit switch LS9, the stage 20 will be halted. With the slab A being placed on the table 43, the cart 42 will travel along the guide rails 41 away from the mold removing apparatus 1 to discharge the slab A.

Figure 10:
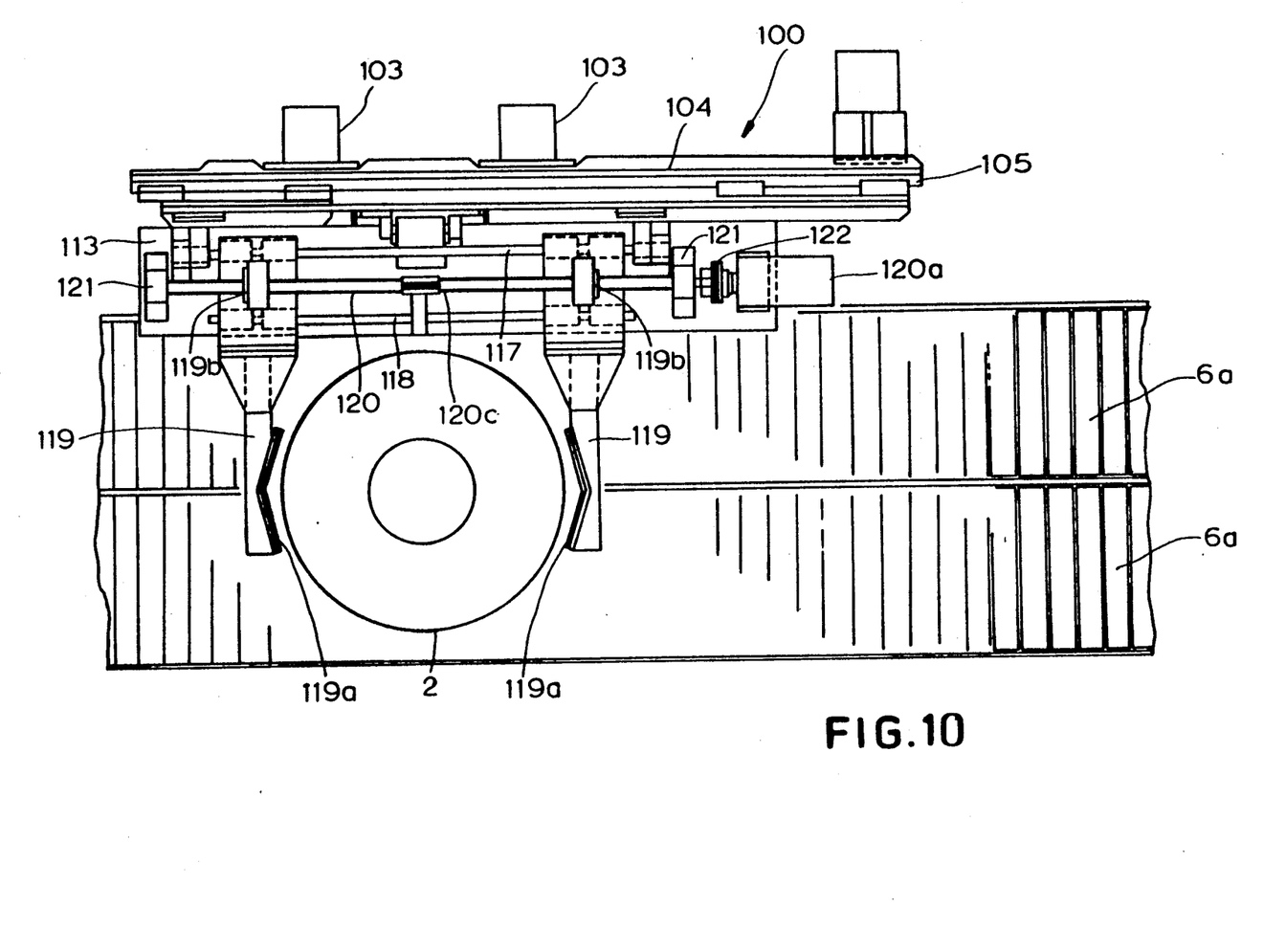
FIG. 10 is a plan view showing the mold transfer apparatus.
Figure 11:
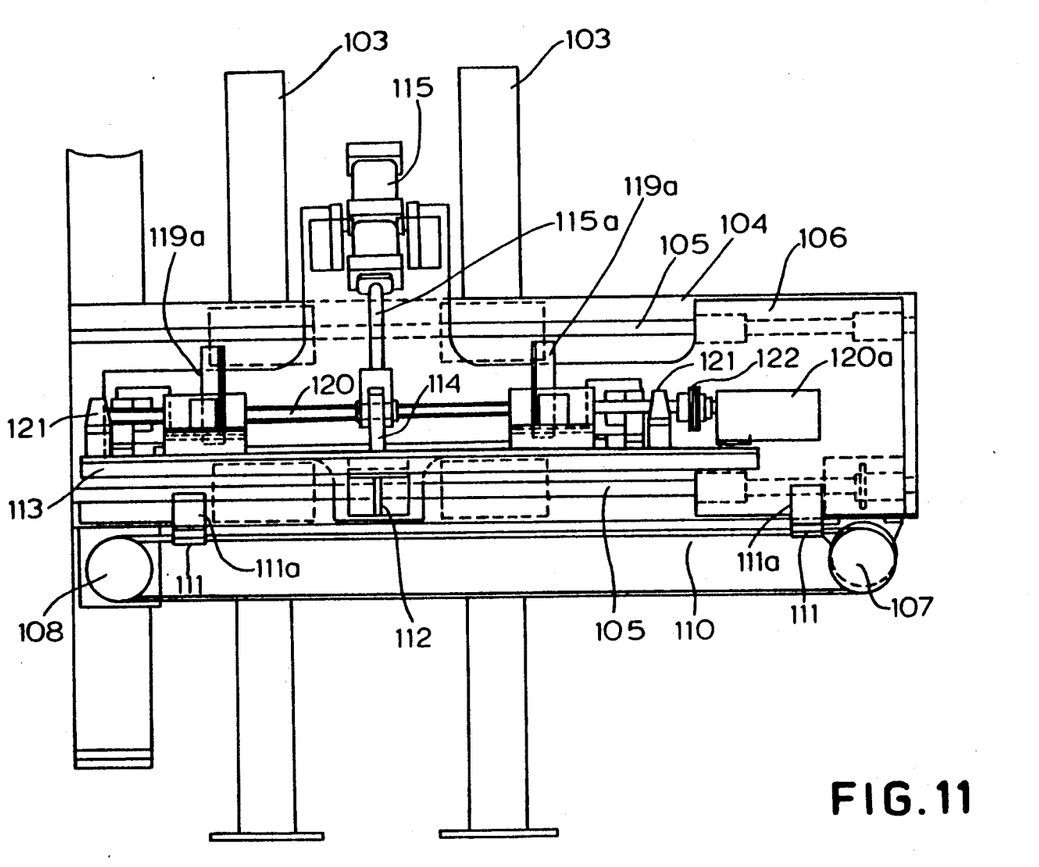
FIG. 11 is a front view of the transfer apparatus of FIG. 10.
Figure 12:
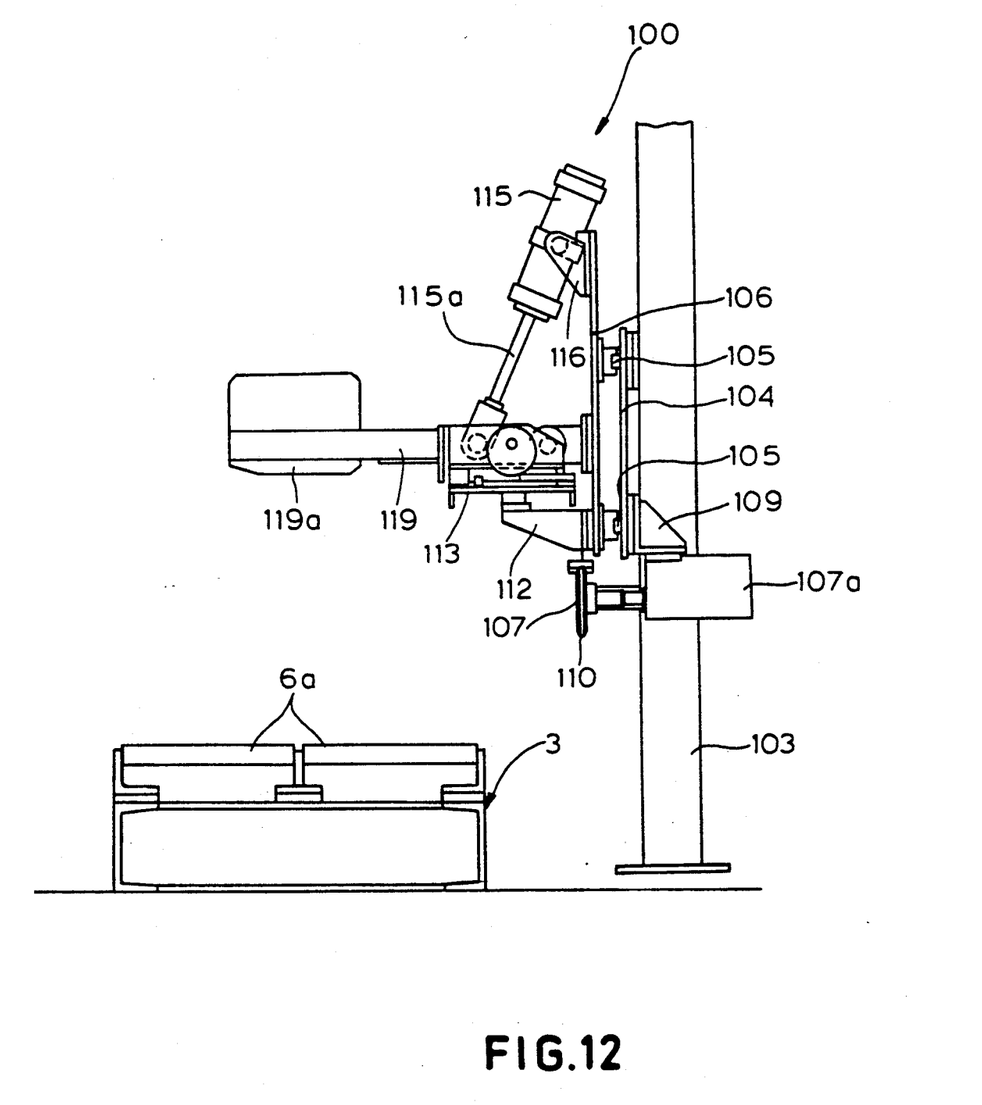
FIG. 12 is a left side view of the transfer apparatus of FIG. 10.

FIG. 10 through FIG. 12 show the mold transferring apparatus. The transferring apparatus 100 is designed to transfer a mold 2 horizontally along conveyor rollers 6a rotatably arranged on the base 3, and the transferring apparatus 100 is installed in parallel with and close to the conveyor rollers 6a.

A support plate 104 is fixed across a plurality of stands 103 erected on the ground, and two parallel linear motor guides 105 are fixed in the upper part and the lower part of the support plate 104. Further, a slide frame 106 is arranged in the vertical direction and is movable along the guides 105.

Beneath the slide frame 106, a drive pulley 107 and a driven pulley 108 are provided on the lower end of the support plate 104 on both sides thereof. The drive pulley 107 is mounted, as shown in FIG. 12, on a drive shaft of a geared motor with brake 107a held on the support plate 104 via a bracket 109. An endless belt 110 is provided across the drive pulley 107 and the driven pulley 108. The endless belt 110 is provided with engaging pieces 111 at two points, and an engaging piece 111a is mounted on the lower end of said slide frame 106, the engaging piece 111a being engageable with the engaging piece 111. With this configuration, when the drive pulley 107 is driven by a motor 107a, the endless belt 110 will be rotated, and an engaging piece 111 will engage with the engaging piece 111a on the slide frame 106 to move the slide frame 106 in one direction.

A stopper bracket 112 is provided on the lower end of the slide frame 106 near the center thereof, the stopper bracket 112 extending forwardly. A vertically-tilting frame 113 which is a support member is horizontally mounted on the stopper bracket 112. A hanging piece 114 is fixed onto the tilting frame 113 at the center thereof, and the top of a piston rod 115a of an air cylinder unit 115 pivotally held by the top end of the slide frame 106 via a bracket 116 is connected to the hanging piece 114. With this arrangement, when the piston rod 115a of the air cylinder 115 is withdrawn, the tilting frame 113 will be tilted upward. When the piston rod 115a is fully extended, the tilting frame 113 will be held horizontally on the stopper bracket 112.

On the tilting frame 113 a pair of linear motor guides 117 and 118 are mounted with a space in between and in parallel with each other in the longitudinal direction. A pair of clamp arms 119 are mounted on the linear motor guides 117 and 118 and move along them. A clamping part 119a at the top of each clamp arm 119 extends forward (the side of the roller conveyor 2), and the left and right opposing clamping parts 119a are formed into a doglegged shape corresponding to the circumferential surface of the cylindrical mold 2.

The root end of each clamp arm 119 is provided, in the middle between said linear motor guides 117 and 118, with a hole having internal thread 119b. A feedscrew rod 120 to be screwed into these threaded holes 119b is rotatably mounted across right and left pillow blocks 121 fixed onto the tilting frame 113. One end of the feedscrew rod 120 is connected, via a torque limiter coupling 122, to the drive shaft of a geared motor with brake 120a fixed onto the tilting frame 113. The feedscrew rod 120 has a coupling 120c in the center thereof, and the right and left portions of the rod 120 are threaded in different directions from each other. The threaded holes 119b of the left and right clamp arms 119 are also threaded in different directions for the corresponding threads of the feedscrew rod 120. Accordingly, when the feedscrew rod 120 is turned in one direction by the motor 120a, the right and left clamp arms 119 and 119 will move towards or away from each other.

With the above-mentioned transferring apparatus 100, the mold 2 is transferred in the following manner. The pair of clamp arms 119 is in a standby position, and the arms 119 are lifted upward and held there together with the tilting frame 113 by the air cylinder unit 115. The interval between the pair of clamp arms 119 has been adjusted in advance by the feedscrew rod 120 so that the interval is greater than the width of the mold 2. When the mold 2 is placed at a specified point on the conveyor rollers 6a, the endless belt 110 will turn towards the mold 2 and the pair of clamp arms 119 will move together with the slide frame 106 till the mold 2 come to a middle position between these arms 119. Then the arms 119 will stay there. Next, the air cylinder unit 115 will extend to set the tilting frame 113 horizontal on the stopper bracket 112. At the same time, the pair of clamp arms 119 will descend to positions on both sides of the mold 2.

Then the feedscrew rod 120 will turn in a specified direction to move the pair of the clamp arms 119 towards the mold 2. The arms 119 will clamp the mold 2. Next, the endless belt 110 will travel in the direction of transfer of the mold 2, and the pair of the clamp arms 119 will move together with the slide frame 106, transferring the mold 2 being clamped by the clamp arms 119 on and along the conveyor rollers 6a to a specified position. After that, the feedscrew rod 120 will be turned in the reverse direction to move the pair of clamp arms 119 away from each other to release the mold 2. The clamp arms 119 will be raised and held therein together with the tilting frame 113 by the air cylinder unit 115.

In the above-mentioned embodiment, to move the mold 2 vertically, an air cylinder unit 7 is provided in the lower part, and a shaft 12 which is moved vertically by the feedscrew mechanism 11 is provided in the upper part. Alternatively, an air cylinder unit may be used in the upper part as well. Instead, a motor-driven feedscrew mechanism may be used in place of the air cylinder unit 7. Furthermore, in the embodiment, the teeth 21 will engage with the lower end face of the slab A when the teeth 21 are advanced. If a control is operated to halt the forward movement of the teeth 21 before the teeth 21 contact the outer circumference of the mold 2, damage to the outer circumference of the mold 2 could be prevented reliably even when the teeth 21 are not made of nylon resin or the like. In the above-mentioned embodiment, the description relates to a case where the mold 2 to which a slab (rubber molding) is sticking is removed. The application of the present invention is not limited to the rubber molding A. It is also applicable to, for instance, urethane resin moldings.

The slab A to be removed from the mold 2 by the above-mentioned mold removing apparatus 1 is one which was vulcanized and then cooled in the preceding process. Thus the preceding process of the mold removing apparatus 1 is provided with a cooling apparatus 140. After the slab A is taken away by the mold removing apparatus 1, the mold 2 will be transferred to the next process step in which a mold release agent such as silicone is applied onto the outer circumference. Thus the next process step is provided with an applicator 170.

Figure 13:
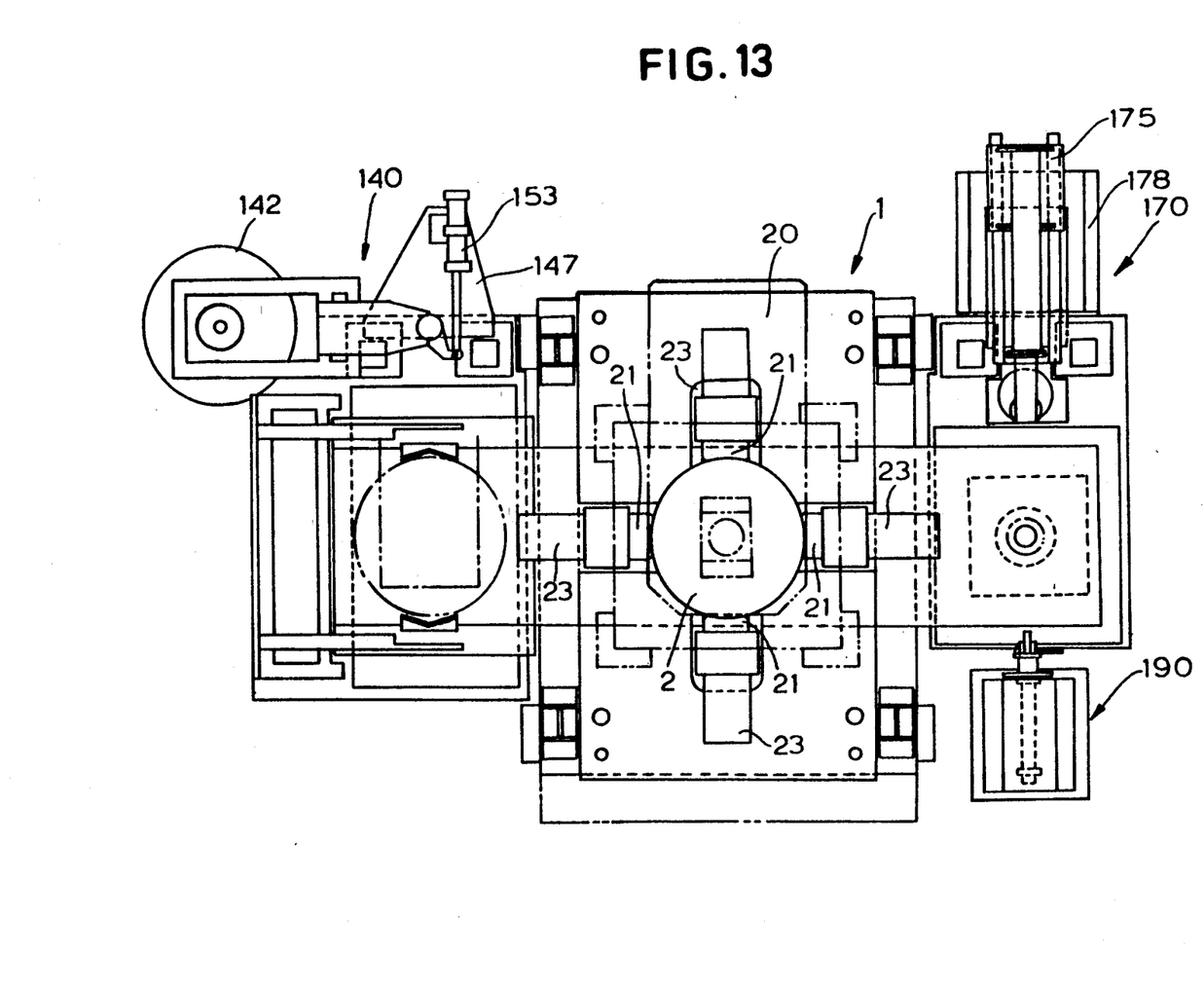
FIG. 13 is a plan view showing the mold removing apparatus according to the present invention in the center position, with a mold cooling apparatus installed in the front and a mold removing agent coating apparatus in the rear thereof.

As shown in FIG. 13, with the mold removing apparatus 1 at the center, the cooling apparatus 140 for the mold 2 is installed in the front, and the applicator 170 in the rear of the mold removing apparatus 1.

Figure 14:
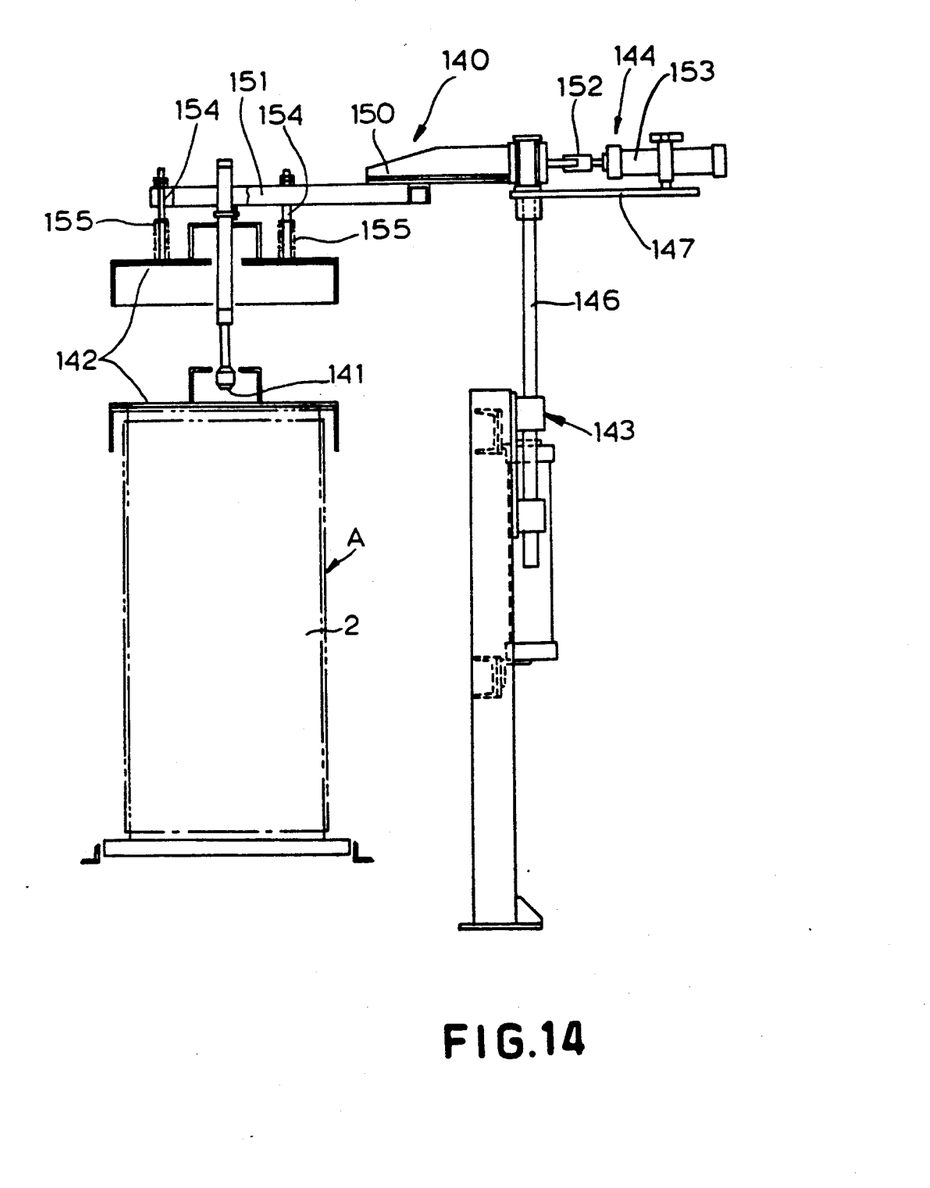
FIG. 14 is a right side view showing the cooling system, partly in section.
Figure 15:
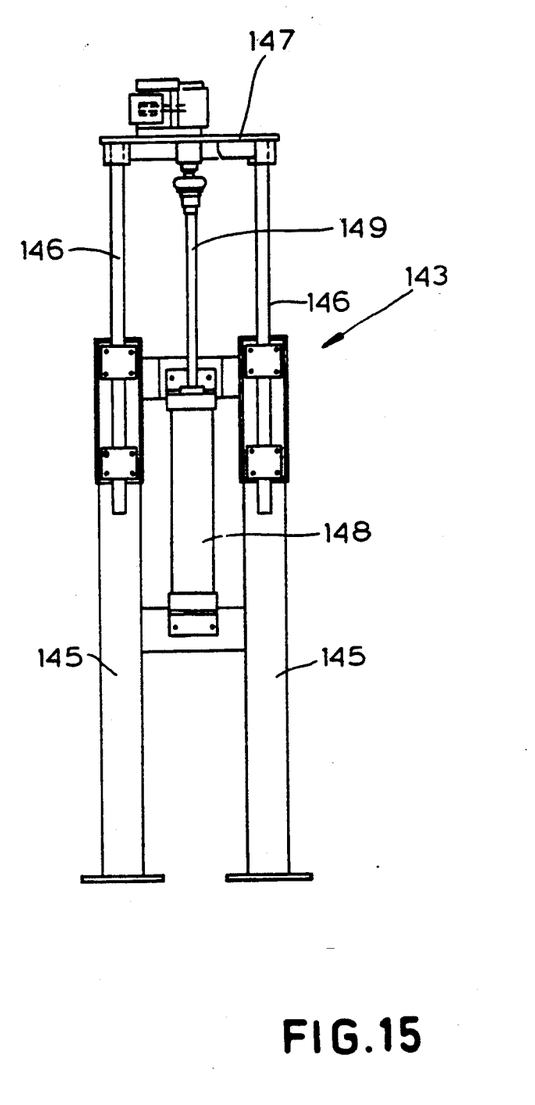
FIG. 15 is a front view of the cooling system.

The cooling apparatus 140 has, as shown in FIG. 14 and FIG. 15, a cooling nozzle 141 for spraying and feeding cooling water into the mold 2, a seal plate 142 for contacting and covering the top end of the mold 2 during cooling of the mold 2, a nozzle lifting means 143 for vertically moving said cooling nozzle 141, and a gyrating mechanism 144 for gyrating the cooling nozzle 141 and the seal plate 142.

In the nozzle lifting mechanism 143, support rods 146 extend upwardly from a pair of support frames 145 so that the rods 146 can move freely in the vertical direction relative to the frames 145. A support plate 147 is fixed to the top ends of both support rods 146. A cylinder unit 148 is arranged nearly in the middle of the support frame 145. The top end of the piston rod 149 of the cylinder unit 148 is connected to support plate 147.

In the gyrating mechanism 144, frame members 150, 151 supporting the cooling nozzle 141 are cantilevered from the support plate 147 so that the frame members 150, 151 can gyrate. The frame members 150, 151 are horizontally gyrated, via a linkage 152, by a cylinder unit 153 mounted on the support plate 147. The seal plate 142 is supported by support rods 154 beneath the top end of the frame member 151, and the seal plate 142 is energized downwardly by springs 155.

With the above-mentioned cooling apparatus 140, when the mold 2 having a vulcanized slab A is placed in a specified position on the conveyor rollers 6a, the frame member 151 will gyrate to position the cooling nozzle 141 and seal plate 142 above the mold 2. The cooling nozzle 141 will be lowered, and the top of the mold 2 will be sealed by the seal plate 142. Under this condition, the mold 2 will be cooled for a certain time from the inside thereof by cooling water which is fed and sprayed from the cooling nozzle 141.

Figure 16:
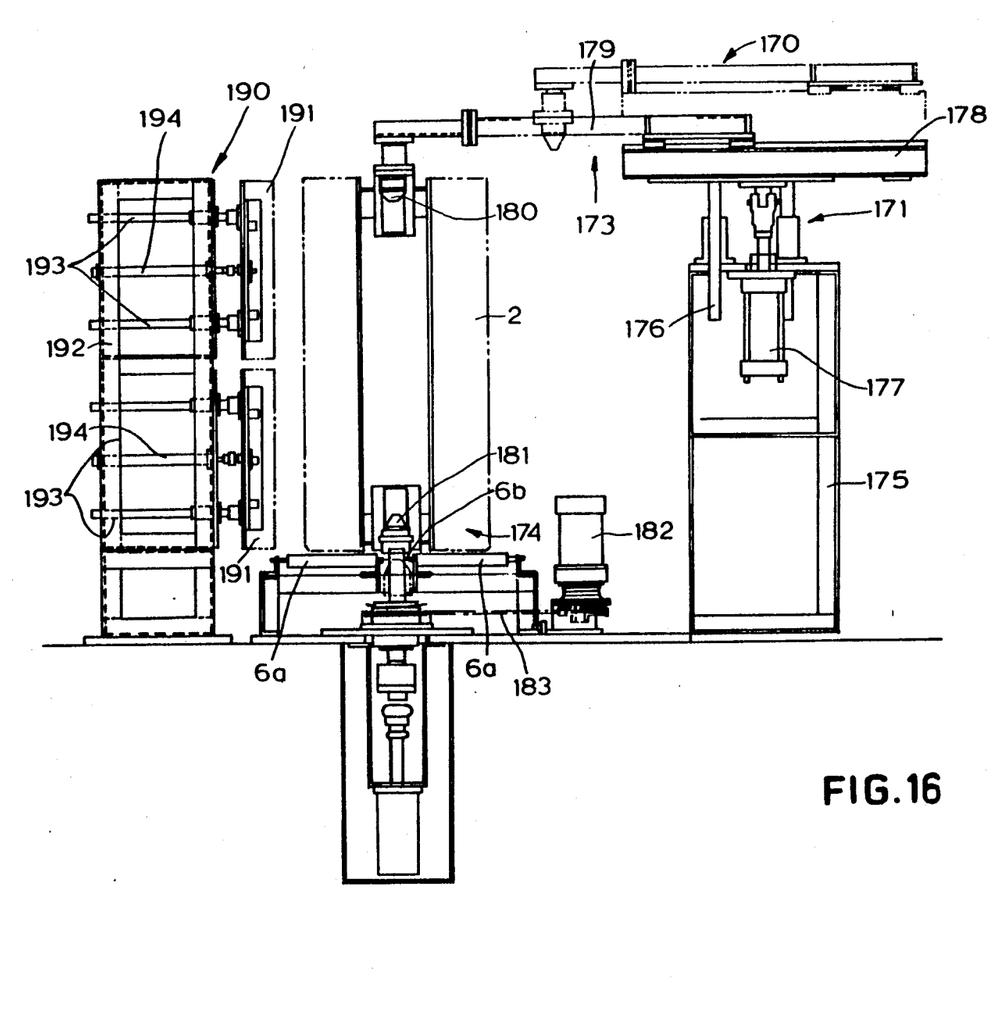
FIG. 16 is a right side view showing the coating apparatus, partly in section.

The applicator 170 comprises, as shown in FIG. 16, a mold rotating mechanism 171 for clamping the mold 2 from above and below and rotating the mold 2, and an application mechanism 190 for applying a mold release agent on the mold 2 being rotated. The mold rotating mechanism 171 comprises a driven support block 173 above the mold 2 and a drive support block 174 beneath the mold 2. The driven support block 173 comprises a frame member 178 which is supported, above the support frame 175, by a support rod 176 so that the frame member moves freely in the vertical direction and which is moved vertically by a cylinder unit 177, and an arm 179 which moves horizontally along the frame member 178 and has a rotatable support piece 180 on the top end thereof. The drive support block 174 comprises a support piece 181 which is arranged so that the piece 181 can be projected upwardly through the central opening 6b of the conveyor rollers 6a and which is driven by a motor 182, via a transmission belt 183.

The application mechanism 190 has such a construction that sponge members 191 for absorbing the mold release agent are supported by support rods 192 so that the sponge members 191 can be freely extended towards the mold 2, and the sponge members 191 are protruded or withdrawn by cylinder units 194.

With the above-mentioned applicator 170, when the mold 2 from which the slab A has been removed is transferred along the conveyor rollers 6a to the applicator 170, the mold 2 will be clamped on the top and bottom by the support pieces 180 and 181. The mold 2 will be rotated when the support piece 1181 is rotated by the motor 182. Then the sponge members 191 will extend forward to contact the outer circumference of the rotating mold 2. As the sponge members 191 have absorbed much mold release agent, the outer circumference of the mold 2 will be coated with the mold release agent.

What is claimed is:

1. A mold removing apparatus for cylindrical moldings, said apparatus comprising a mold having a circumferential wall forming an external circumferential surface for supporting a molding thereon, said molding having at least one end face, said mold being hollow, having center bores at the center of both the top and the bottom thereof, and having a plurality of small through holes in said circumferential wall, a mold lifting apparatus which includes, positioning pieces which are insertable into said respective center bores of said mold, said pieces holding said mold between the top and the bottom to raise the mold to the specified elevations, a pressurized fluid inlet port which is provided in said positioning pieces to introduce a pressurized fluid into said cavity of said mold, a mold removing means including a plurality of teeth which are arranged to move towards or away from said outer circumferential surface of said mold, said teeth being capable of contacting or closing to the outer circumferential surface of said mold to engage said end face of said molding, a lifting mechanism for lifting or lowering said mold removing stage in the axial direction of said mold, and a mold transferring machine for delivering the mold to and discharging the mold from said mold lifting apparatus.

2. A mold removing apparatus according to claim 1, wherein said mold removing means further comprises a plurality of holders which are movable towards and away from said molding, said holders being such as to hold the molding removed from said outer circumferential surface of said mold by said teeth, and a molding discharge apparatus which extends above said molding transfer apparatus to receive the molding.

3. A mold removing apparatus according to claim 1 or claim 2, wherein said mold transfer apparatus is provided with a transfer mechanism for transferring said mold horizontally along conveyor rollers, and said transfer mechanism comprises a shifting member being movable freely in parallel with the conveyor rollers and is movable by a shifting mechanism, a support member which is arranged on said shifting member to tilt freely in the vertical direction, said support member including a surface which is held horizontally or tilted upwardly by a cylinder mechanism, and a pair of clamp members which are extendable towards said transfer mechanism and are movable in parallel with said transfer mechanism, said clamp members being movable towards and away from each other by a feed mechanism.

4. A mold removing apparatus according to claim 1 wherein, the mold removing apparatus is placed between a mold cooling apparatus and an applicator of a mold release agent.

* * * * *